United States Patent [19]

Hyltoft

[11] Patent Number: 4,798,373
[45] Date of Patent: * Jan. 17, 1989

[54] SHEET FEEDING DEVICE FOR USE IN AN ELECTROPHOTOGRAPHIC INFORMATION PRINTER

[75] Inventor: Hans C. Hyltoft, Vaerlose, Denmark

[73] Assignee: Mercante International A/S AF 1986, Glostrup, Denmark

[*] Notice: The portion of the term of this patent subsequent to Aug. 12, 2003 has been disclaimed.

[21] Appl. No.: 802,156

[22] Filed: Nov. 25, 1985

Related U.S. Application Data

[62] Division of Ser. No. 662,553, Oct. 19, 1984, Pat. No. 4,605,215.

[30] Foreign Application Priority Data

Nov. 3, 1983 [DK] Denmark ............... 5047/83
Sep. 14, 1984 [DK] Denmark ............... 4388/84

[51] Int. Cl.[4] ........................... B65H 3/44
[52] U.S. Cl. ........................... 271/9; 271/10; 271/114
[58] Field of Search ............... 271/9, 10, 114, 266, 271/162, 164; 355/14 SH

[56] References Cited

U.S. PATENT DOCUMENTS

| | | |
|---|---|---|
| 3,698,804 | 10/1972 | Cranskens et al. |
| 3,883,242 | 5/1975 | Takahashi et al. |
| 4,165,069 | 8/1979 | Colglazier ............... 271/162 |
| 4,180,319 | 12/1979 | Kaufmann et al. |
| 4,236,807 | 12/1980 | Kuehnle |
| 4,297,025 | 10/1981 | Bach et al. |
| 4,444,385 | 4/1984 | Berry ............... 271/114 X |
| 4,459,052 | 7/1984 | Lundblad |
| 4,519,601 | 5/1985 | Watanabe |

FOREIGN PATENT DOCUMENTS

| | | |
|---|---|---|
| 8002464 | 11/1980 | Int'l Pat. Institute |
| 1446531 | 8/1976 | United Kingdom |
| 1570870 | 7/1980 | United Kingdom |
| 2041830 | 9/1980 | United Kingdom |

Primary Examiner—Richard A. Schacher
Attorney, Agent, or Firm—Bernard, Rothwell & Brown

[57] ABSTRACT

A processing station in an electrophotographic information printer, comprising at least one mechanically movable, preferably rotatable member (19) comprises as a drive for said member (19) an electronic stepping motor (38) which is supplied with drive pulses of a predetermined pulse number and frequency from a motor drive unit (39) which is connected with a program-controlled control unit (35) for operating the stepping motor (38) in an operational sequence for the information printer.

7 Claims, 4 Drawing Sheets

SHEET FEEDING DEVICE FOR USE IN AN ELECTROPHOTOGRAPHIC INFORMATION PRINTER

This is a division of application Ser. No. 662,553 filed Oct. 19, 1984, now U.S. Pat. No. 4,605,215.

This invention relates to a sheet feeding device for use in an electrophotographic information printer, for advancing individual sheets of a printing material from a sheet supply to a sheet processing station.

Information printers for use in connection with data and word processing systems may essentially be divided into two main categories. In one category, the transformation of electronic character information into printed information on a paper sheet is performed by means of writing devices operating with mechanical impact in connection with carbon ribbons in the same way as known from manually operated typewriters. Printers of this category comprising, inter alia, matrix printers and daisy-wheel printers have a relatively low speed and have appeared in practice to be rather sensitive in mechanical respects and, in addition, in respect of reproduction performance they are limited to a definite number of characters.

The other main category operates without mechanical impact and comprises mainly so-called jet-ink printers and machines operating with an electrophotographic transfer of information in connection with the xerographic reproduction technology known from usual copying machines. In particular, machines of the latter kind comprise laser printers, in which an electrostatically latent image is formed on a photoconductor by means of a controlled laser beam. Due to the very high printing speed and the fact that in respect of information reproduction they are not limited to a definite number of e.g. alpha-numerical characters defined e.g. by the characters on a daisy-wheel, these machines are finding increasing use.

The electrostatically latent image is developed by means of toner powder and is transferred to a paper sheet and affixed thereto under use of the well-known xerographic technology.

Since the starting point for such information printers has been the technology known from usual xerographic copying machines, these machines are designed, in practice, in the same way as conventional copying machines with a number of processing stations comprising a photoconductor station with an electrostatically chargeable, movable photoconductor;

an imaging station in optical information transfer relation to the photoconductor station;

a developer station with a toner development system and a toner cleaning station arranged in operative relation to the photoconductor station;

an image transfer station arranged in operative relation to the photoconductor station for transferring a toner image on the photoconductor to a sheet-shaped printing material;

a sheet feeding device for supplying sheets of printing paper individually from a sheet supply to the image transfer station;

a fixation station for permanently affixing a toner image to the printing material; and an advancing station arranged between the image transfer station and the fixation station.

As a driving means, use is made in such machines of a single motor for several mechanically movable, usually rotatable members, such as photoconductor drums, sheet advancing rollers, and toner transport mechanisms, complicated transmission means being often used between the driving means and the individual rotating members or between the latter mutually.

As in the case of conventional copying machines, this machine design makes maintenance heavily complicated and often results in interruptions of operation of long duration, since irregularities in the mechanical functions usually require a difficult and time-consuming repair involving replacement and/or adjustment of components which are frequently difficult to access.

Whereas these disadvantages may usually be tolerated in connection with conventional reproduction equipment, they will often be considered unacceptable in connection with data and word processing systems and in this field attempts are made to circumvent them by use of spare equipment with the costs resulting therefrom.

Due to the high printing speed of non-impact information printers of the xerographic type the sheet supply device which picks up sheets individually from a sheet supply and advances them into a sheet advancing path leading to the image transfer station must be able to perform its functions quickly and reliably in an exactly timed relationship to the rotation of the xerographic device so that a sheet advanced from the sheet supply will arrive at the image transfer station in synchronism with the powder image formed on the xerographic device.

Conventional driving means and transmission devices as mentioned above will normally put restrictions on the structural design of the sheet device and its location in the machine frame with respect to the single drive motor and the image transfer station.

It is the object of the invention to avoid such restrictions and provide a new design of a sheet feeding device breaking with the conventional technical structure of electrophotographic machines through a very simple structural design resulting in a higher level of precision in the control of the sheet advancing movement, a considerably simpler maintenance and an increased flexibility with respect to machine structure and function.

According to the invention there is provided a sheet feeding device for use in an electrophotographic information printer with a xerographic system for advancing individual sheets of a printing material from a sheet supply to an image transfer device arranged in operational cooperation with a movable photoconductor, said sheet feeding device comprising a collecting roller arranged for engagement with the upper sheet in the sheet supply, and a pair of advancing rollers comprising a driven roller, individual drive means comprising an electronic stepping motor being mechanically coupled to said collecting roller and/or said driven advancing roller, a device for supplying drive pulses to the stepping motor of a predetermined pulse number and pulse frequency being connected to a program-controlled control unit for operating the stepping motor in an operational sequence for said information printer, whereby to allow sequential operation of the rollers for rotation with individually adjustable rotational speed direction and duration.

As a result of the use of an electronic stepping motor as a driving means the general requirement for a mechanical transmission from the sheet feed device to a common motor is eliminated, which also makes a major contribution to make the information printer more easy to service by improving the accessibility to all parts of the machine.

In operation, the stepping motor will be individually supplied with pulse sequences which, without any need for feed-back or position-sensing, causes it to rotate with a prescribed speed or a prescribed angular turn. As a result thereof, an essentially more accurate control is obtained than possible for conventional driving means in xerographic machines.

In a sheet feeding device according to the invention, the further advantage is obtained that operation parameters for the sheet movement may be changed individually. Thereby, it is made possible for a given machine to make changes in the sheet feeding device concurrently with the development of technology without any need of changes in other parts of the machine.

As a particular advantage, the invention opens the possibility to use an increased number of different sheet supplies, whereby either the sheet capacity of the machine is increased with automatic switching between the individual paper supplies, so that interruptions of operation following from feeding of sheets are avoided, or the machine may operate with an increased number of different sheet types which may be individually selected.

To obtain this, the said rollers and stepping motors may be built into a closed sheet cassette having an outlet slit in one of the cassette walls and in a suitable design of this embodiment said sheet outlet slit is positioned in one of the major side walls of the cassette aligned with the pair of advancing rollers for receiving sheets from the outlet slit of a further corresponding sheet cassette.

In the following, the invention will be explained in further detail with reference to the accompanying drawings, in which FIG. 1 is a perspective view of an information printer with a sheet feeding device according to the invention;

Figure 1:
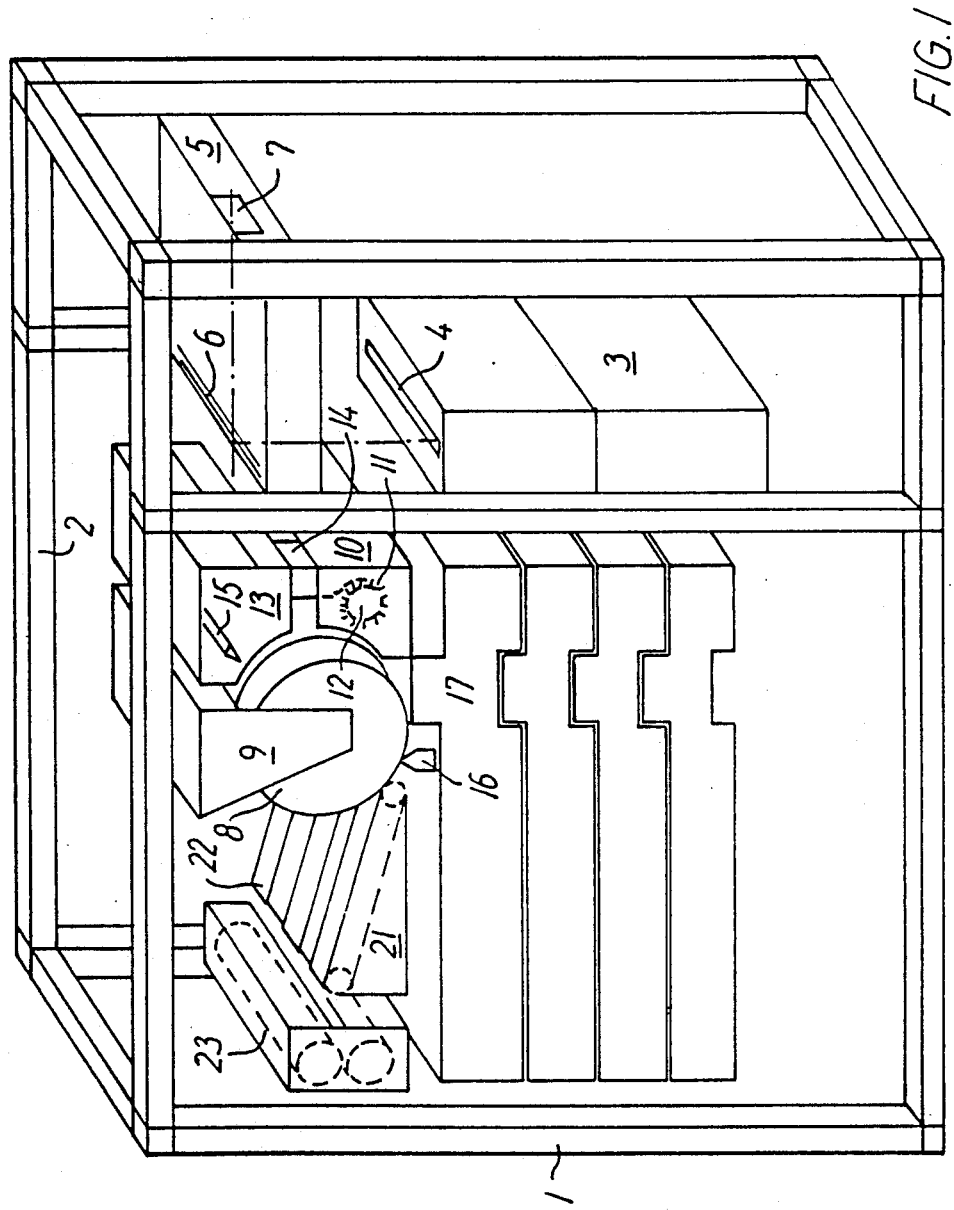

In the information printer shown in FIG. 1, the machine casing, the side walls of which are removed, comprises a box-like frame structure having vertical and horizontal frame members 1 and 2, to which supporting means, not illustrated, are secured in the form e.g. of sliding rails for the arrangement of the processing station designed as separate individually replaceable modules.

An imaging module 3, to which electronic information signal codes are supplied, is constituted in this embodiment by an electronically controlled linescanning electro-optical device having a scanning direction, as shown by a light exit slit 4.

Such an electro-optical device may be constituted e.g. by a cathode ray tube having a high brilliance whereby the advantage is obtained that the imaging unit unlike other scanning imaging devices does not comprise mechanically moved scanning members.

However, also devices of the latter kind employing e.g. a controlled laser beam may be used.

An optical module 5, which may be of a design known per se including mirrors 6 and 7, causes light information from the imaging module 3 to be focused onto a movable photoconductor 8 in a photoconductor module 9.

The photoconductor 8 may consist in a known manner of a rotating drum having a photoconductive coating.

In an operative relation to the photoconductor 8, a developer module 10 is arranged having a toner supply 11 and a rotating magnetic brush 12 for transferring toner powder onto the photoconductor for development of a latent electrostatic image thereon.

Moreover, there is arranged in association with the photoconductor 8 a toner cleaning and recycling module 13, which is connected with the developer module 10 through a duct 14.

The module 13 is arranged above the module 10 with an intermediate separation allowing for passage of the optical information from the module 5 onto the photoconductor 8.

In the module 13 or in connection therewith, an electrostatic charging means in the form of a corona wire 15 is arranged.

In order to decharge the photoconductor 8 for the purpose of transferring a powder image developed by means of the developer module 10 onto a sheet of printing material, an image transferring module 16 having a corona wire is provided.

In order to advance the sheet material from a sheet supply to image transfer contact with the photoconductor 8, a sheet feeding device 17 is provided, which is designed with a collecting roller 18 and sheet advancing rollers comprising a driven roller 19 and a number of pressure rollers 20. In the embodiment shown, the sheet feeding unit is built into a sheet cassette, the detailed design of which will appear from the following.

Subsequent to the image transfer, the information carrying sheet is stripped from the photoconductor 8 and transferred to a second sheet advancing module 21. By means of this module, which may comprise e.g. a number of belts 22, the sheet is transferred to a fixation module 23 for permanently affixing the transferred powder image to the sheet.

In the information printer shown in FIG. 1, the module 23 may be either of the hot fusing or the pressure fixation type.

The modules 3, 5, 9, 10, 13, 16, 17, 21, and 23 are all designed as separate, individually replaceable modules, and those modules comprising mechanically movable parts, in the example shown rotating elements, i.e. all the above mentioned modules with the exception of the modules 3, 5, and 16, comprise each as an independent drive means an electronic stepping motor.

Figure 2:
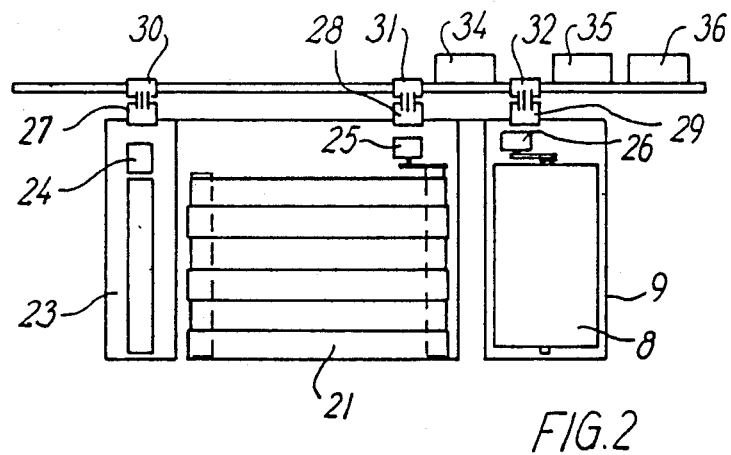
FIG. 2 illustrates the connection of a number of module units to a coupling unit.

As is apparent from FIG. 2 showing the modules 10, 21, and 23, each of the stepping motors 24, 25, and 26 associated therewith are built-in into its own module in the embodiment shown, whereby an optimum flexibility in respect of the machine design is obtained.

For each module, the only external connection consists of a plug 27, 28, and 29, respectively, for direct insertion into terminal connections 30, 31, and 32 of a coupling unit 33, which may have the same design as i circuit card. The terminal connections 30, 31, and 32 are connected, on one hand, to a power supply unit 34 for supplying operational voltages to the modules and, on the other hand, to a common program-controlled control unit 35. The plugs may be fixed with respect to the individual modules as shown, or they may be connected therewith through relatively short wire conductors, for instance a multi-conductor flat cable.

The units 34 and 35 are arranged together with an interface module 36 on the side of the plate-shaped coupling unit 33 opposite the modules 10, 21, and 23.

The interface module 36 serves in a known manner as a matching device between the imaging module 3 and an electronic data or word processing system in accordance with the standard protocol applicable therefor.

Figure 3:
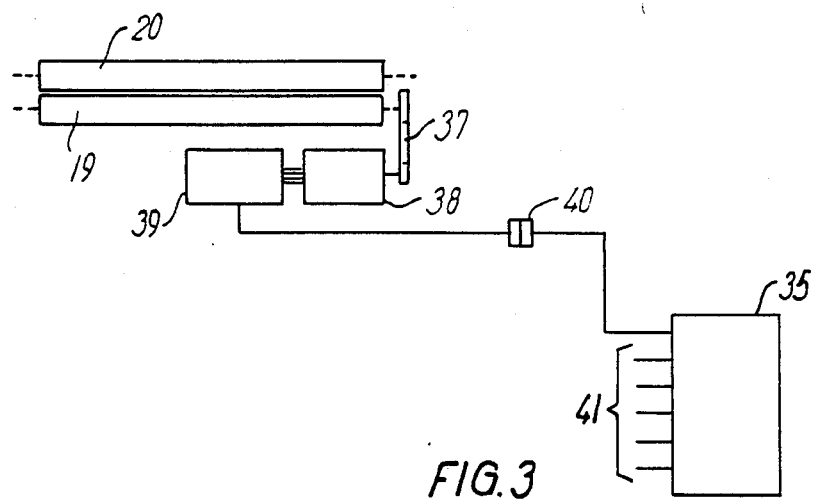
FIG. 3 is a block diagram illustrating the control of a stepping motor in a processing station.

FIG. 3 shows schematically the features of the sheet feeding device having a pair of rollers 19, 20, which are essential to the invention.

The driven roller 19 is connected through a toothed belt transmission 37 with the output shaft of an electronic stepping motor 38 which is supplied with drive pulses from a motor drive unit 39. In a module design, the motor drive unit 39 may be arranged in the module itself, possibly in direct integration with the stepping motor 38. The motor drive unit 39 is connected by means of a plug and socket connection 40 to the program-controlled control unit 35 which, as indicated by outputs 41, may be common to stepping motors in a number of different processing stations.

In a manner known per se, the stepping motor 38 is provided with a number, for instance four, pulse operated windings which may be actuated from the motor drive unit 39 so as to cause the stepping motor to perform a certain angular turn, for instance 1.8° or 3.6°, in one or the other direction of revolution dependent on the switching configuration of the drive windings, not illustrated, at each supplied drive pulse. Thus, the number of revolutions or the angular turn performed in a given operational phase for the stepping motor will be determined by the number of pulses, whereas their separation or the pulse frequency will determine the velocity and acceleration in the rotation of the stepping motor and the pulse power, i.e. the product of pulse height and width, will determine the torque.

Thus, by controlling the supply of drive pulses from the motor drive unit 39 to the stepping motor 38, an arbitrary desired movement function of the stepping motor 38 and, thereby, of the member driven by it, in this case the roller 19, may be realized in practice.

Figure 4:
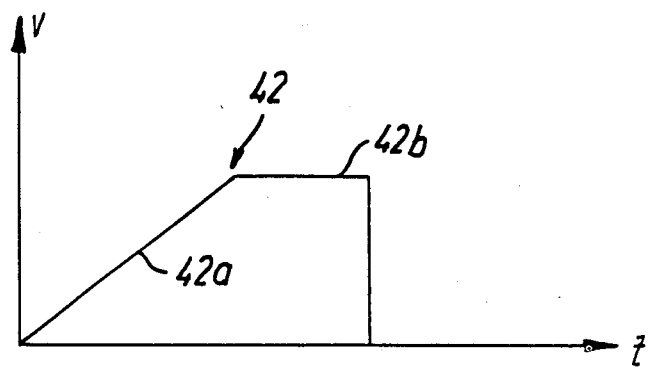
FIGS. 4 and 5 are function and pulse diagrams for explaining the control of the stepping motor.
Figure 5:
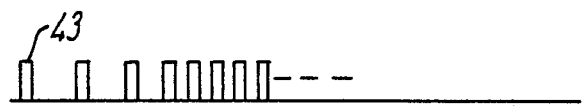

In FIGS. 4 and 5, an example thereof is illustrated purely schematically, FIG. 4 showing a movement diagram, for instance for the roller 19, for velocity v as a function of time t. In this example, the course of movement illustrated by a curve 42 comprises an acceleration phase 42a succeeded by a rotational phase 42b of constant velocity. Such a course of movement may be realized by means of a pulse train of the form shown very schematically in FIG. 5, in which the separation of the pulses 43 in a first portion corresponding to the acceleration phase 42a is gradually reduced corresponding to a gradually increased pulse frequency, after which the pulse separation is kept constant in the succeeding part of the pulse train corresponding to the rotational phase 42b.

The generation of drive pulses in the motor drive unit 39 is actuated and controlled from the control unit 35 which may comprise a micro processor provided in a manner known per se with an internal clock unit and a program memory, for instance of the EPROM type. In the program memory of the micro processor, programmes or subroutines for the actual movement function to be performed of each of the stepping motors controlled by the control unit in the operational phase associated therewith within the entire operational sequence are stored in addition to the main program for the entire sequence of operations to be performed by the processing stations controlled by the control unit.

Each of these subroutines comprises complete information about the pulse train to be generated in the motor drive unit 39 for the performance of the desired movement function. The motor drive unit 39 comprises a pulse generator for generating drive pulses of the pulse power necessary to obtain a desired torque, and a logic circuit which under control by the information supplied from the control unit establishes the switching configuration for the windings of the stepping motor corresponding to the rotation in the desired direction of revolution, on one hand, and supplies the drive pulses to the stepping motor in a pulse train comprising the prescribed number of pulses with the prescribed mutual separation thereof, on the other hand.

For a given machine configuration, the desired movement function for a given stepping motor in a certain operation phase within an operational sequence, as well as the drive pulse train from the motor drive unit 39 associated therewith and the control information contained in the associated subroutine in the micro processor will remain unchanged, so that each subroutine is buried in fixed form into the program memory.

However, the design of the program memory as an EPROM type memory opens a simple and advantageous possibility of reprogramming of any stored movement function with the possibility resulting therefrom for a single processing station without interferring with the functions of the remaining processing stations.

Figure 6:
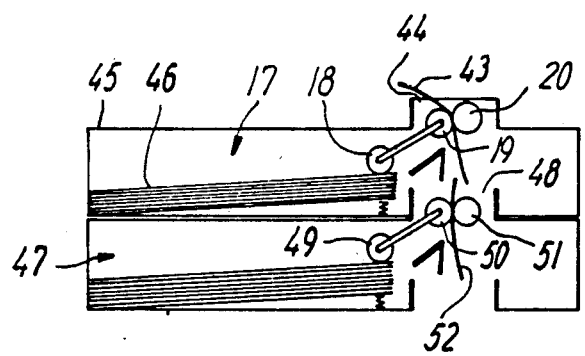
FIG. 6 shows the design of sheet cassette modules.

As shown in FIG. 6, the sheet advancing rollers 19 and 20 and a guide wall 43 cooperating therewith are positioned below a sheet outlet opening 44 in the upper wall of a cassette 45 outside a sheet supply 46 positioned therein.

For cooperation with one or more underlying cassettes 47, only one of which is shown in FIG. 6, an opening 48 is, furthermore, provided in the bottom wall of the cassette 45 to receive sheets from the cassette 47.

In principle, the cassette 47 is designed in the same way as the cassette 45 in respect of the positions of a sheet collecting roller 49 and sheet advancing rollers 50 and 51. However, in this case the guide wall 52 cooperating with the latter rollers has a more rectilinear form for advancement of sheets from the cassette 47 to the intermediate clearance between rollers 19 and 20 in the cassette 45, the guide wall 43 of which is curved to define a sheet advancing path leading to the image transfer module 16.

Figure 7:
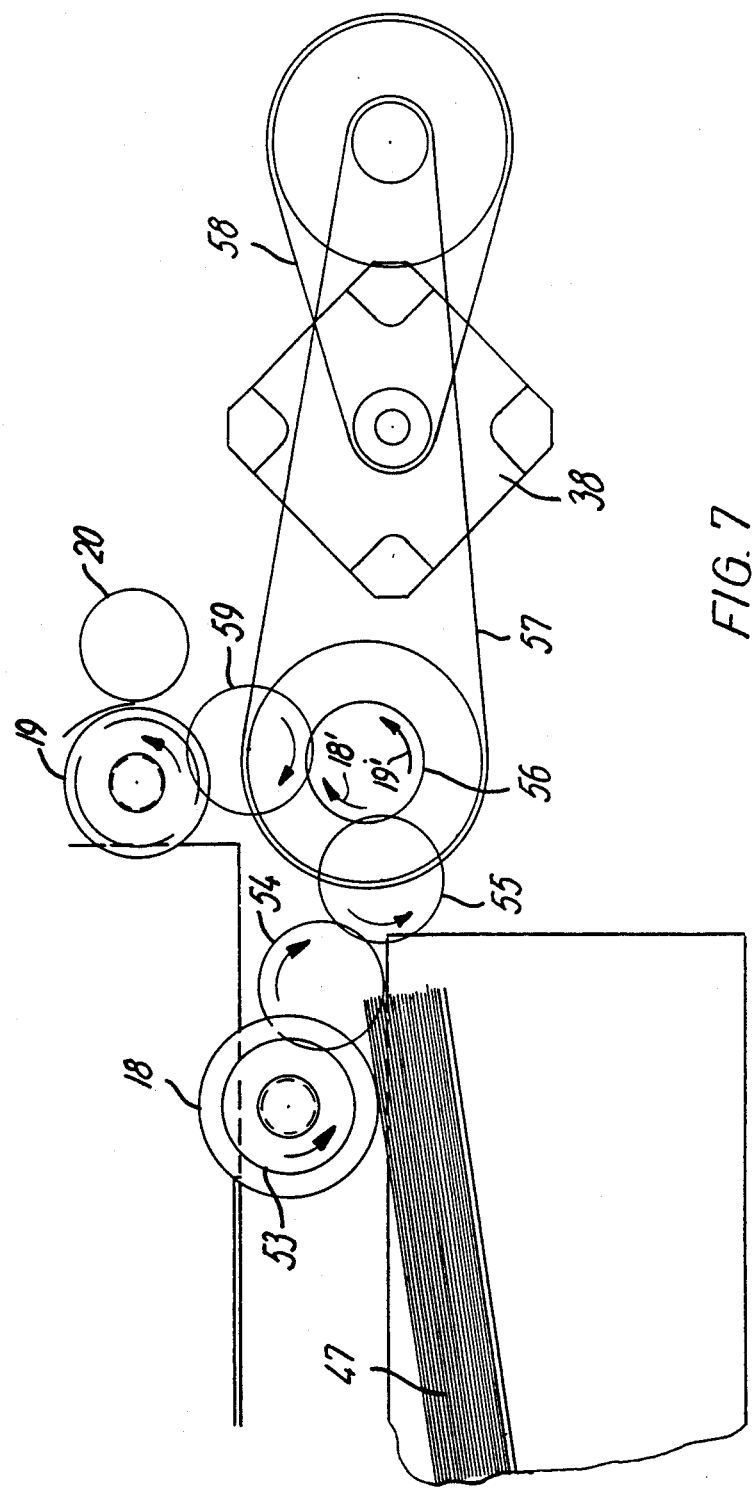
FIG. 7 shows a part of FIG. 3 at a larger scale.

In FIG. 7, the drive arrangement for a sheet feeding unit as shown in FIG. 6 is shown at a larger scale. As members which must perform a driven rotational movement and, therefore, be in drive connection with the stepping motor 38, the collecting roller 18 and the driven advancing roller 19 are provided in this example.

The collecting roller 18, the rotational movement of which for collecting the upper sheet from the sheet supply 46 shall be counter-clockwise, as shown by an arrow, is connected with a gear 53 which engages through a gear transmission comprising two wheels 54 and 55 a drive gear 56 connected with the stepping motor 38 through a douple toothed belt transmission 57, 58.

The driven advancing roller 19, which for the purpose of sheet advancing in the gap between itself and the pressure roller 20 must likewise rotate counter-clockwise, is connected with the drive gear 56 through a gear transmission comprising a single wheel 59. As will appear from the rotational directions for gears 54, 55 and 59, shown by arrows, this arrangement entails that in the operational phase for the collecting roller 18, the drive gear 56 must rotate clockwise, and in the rotational phase for the driven advancing 19, it must rotate counter-clockwise, as shown by opposed arrows 18' and 19', respectively.

Thus, the stepping motor must be caused to rotate with opposite directions of revolution in the two operational phases for the rollers 18 and 19 immediately succeeding each other. However, as will appear from the above explanation, this may also be realized without difficulty by the described control of the stepping motor 38.

Since the gear 53 connected with the collecting roller 18 is in drive engagement with the drive gear 56 also during the operational phase of the roller 19 and is still in frictional engagement with the sheets collected from the sheet supply 46 in a substantial part of this operational phase, the connection between the collecting roller 18 and the gear 54 is constructed with a free-running mechanism, for instance in the form of a ratchet or spring mechanism allowing rotation of gears 54, 55 and drive gear 56 and, thereby, of the stepping motor 38 with the opposite direction relative to that prescribed for the operational phase of the collecting roller 18 itself.

Thus, it will appear that there is no obstacles to the actuation of the different rotatable rollers with individual directions of revolution in a given processing station in different operational phases during an operational sequence by means of a single stepping motor, even if relatively closely positioned members must be operated in different phases. If several rollers are to be operated in the same phase or step in an operational sequence, or if the connection with a common stepping motor will require a relatively complicated transmission, it will often be more advantageous to use a stepping motor individually for each of the driven rollers.

Although the advantages of the invention will appear to the widest possible extent in case of an apparatus composed entirely of modules like the described information printer, the advantages with respect to a more accurate control will in particular, also be obtainable if only a few processing stations are designed in accordance with the invention. As an example, a sheet feeding unit like the one described above, in particular when provided with several sheet cassettes, may be employed with considerable advantages also in practice having for the remaining part a more conventional structure.

In addition, processing stations according to the invention may also be used with advantage without being designed as replaceable modules, although the use of a stepping motor as a drive means will give particularly good possibilities for a simple module design as mentioned above. Thus, nothing would prevent the use of a sheet feeding arrangement like the one described above in connection with a sheet supply of a more conventional design in a electrophotography apparatus.

I claim:

1. In an electrophotographic information printer with a xerographic system controlled by a program-controlled unit, a sheet feeding device for advancing individual sheets of a printing material from a sheet supply to an image transfer device arranged in operational cooperation with a movable photoconductor, said sheet feeding device comprising a collecting roller arranged for engagement with the upper sheet in the sheet supply, a pair of advancing rollers including a driven roller, individual drive means including an electronic stepping motor being mechanically coupled to said collecting roller and said driven advancing roller through transmission members, the collecting roller being coupled with the stepping motor through a transmission member allowing free-wheeling with opposite direction of the stepping motor relative to the direction prescribed for the operation of the collecting roller, and a device responsive to the program-controlled unit for supplying to the stepping motor a predetermined number of pulses at a controlled pulse frequency to operate the stepping motor in an operational sequence for said information printer, whereby the collecting roller and the driven advancing roller are rotated with controllable rotational speed, direction and duration.

2. A sheet feeding device as claimed in claim 1, wherein said rollers and stepping motor are built-in in a closed sheet cassette having a sheet outlet slit in one of the cassette walls.

3. A sheet feeding device as claimed in claim 2, wherein said sheet outlet slit is positioned in one of the major side walls of the cassette, the opposite major side wall being provided with a slit communicating with the pair of advancing rollers for receiving sheets from the outlet slit of a further corresponding sheet cassette.

4. A sheet feeding device as claimed in claim 1, wherein said rollers and stepping motor are built-in in a closed sheet cassette having a sheet outlet slit in one of the cassette walls.

5. A sheet feeding device as claimed in claim 4, wherein said sheet outlet slit is positioned in one of the major side walls of the cassette, the first side wall being provided with a slit aligned with the pair of advancing rollers for receiving sheets from the outlet slit of a further corresponding sheet cassette.

6. A sheet feeding device as claimed in claim 1, wherein said rollers and stepping motor are built-in in a closed sheet cassette having a sheet outlet slit in one of the cassette walls.

7. A sheet feeding device as claimed in claim 6, wherein said sheet outlet slit is positioned in one of the major side walls of the cassette, the first side wall being provided with a slit aligned with the pair of advancing rollers for receiving sheets from the outlet slit of a further corresponding sheet cassette.

* * * * *